(12) United States Patent
Matthews et al.

(10) Patent No.: US 7,669,140 B2
(45) Date of Patent: Feb. 23, 2010

(54) SYSTEM AND METHOD FOR PROVIDING RICH MINIMIZED APPLICATIONS

(75) Inventors: David A. Matthews, Seattle, WA (US);
Charles Cummins, Seattle, WA (US);
Justin Mann, Redmond, WA (US);
Judson Craig Hally, Sammamish, WA (US); Mark Ligameri, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 10/644,967

(22) Filed: Aug. 21, 2003

(65) Prior Publication Data
US 2005/0044058 A1    Feb. 24, 2005

(51) Int. Cl.
*G06F 3/048* (2006.01)
(52) U.S. Cl. .......................................... 715/779; 707/1
(58) Field of Classification Search ................. 715/779; 707/1
See application file for complete search history.

(56) References Cited

U.S. PATENT DOCUMENTS

| | | | |
|---|---|---|---|
| 4,692,757 A | 9/1987 | Tsuhara et al. | |
| 5,363,481 A | 11/1994 | Tilt | |
| 5,513,342 A | 4/1996 | Leong et al. | |
| 5,602,997 A | 2/1997 | Carpenter et al. | |
| 5,634,002 A | 5/1997 | Polk et al. | |
| 5,659,693 A * | 8/1997 | Hansen et al. | 715/779 |
| 5,699,535 A | 12/1997 | Amro | |
| 5,712,995 A | 1/1998 | Cohn | |
| 5,757,371 A * | 5/1998 | Oran et al. | 715/779 |
| 5,880,725 A | 3/1999 | Southgate | |
| 6,008,809 A * | 12/1999 | Brooks | 715/792 |
| 6,057,836 A | 5/2000 | Kavalam et al. | |
| 6,072,486 A * | 6/2000 | Sheldon et al. | 715/835 |
| 6,216,141 B1 * | 4/2001 | Straub et al. | 715/513 |
| 6,239,798 B1 * | 5/2001 | Ludolph et al. | 715/788 |

(Continued)

FOREIGN PATENT DOCUMENTS

EP     0487383 A2    5/1992

(Continued)

OTHER PUBLICATIONS desktopsidebar.com, "Desktop Sidebar v1.03 is out!", Aug. 3, 2003, pp. 1-4.*

(Continued)

*Primary Examiner*—Weilun Lo
*Assistant Examiner*—Tuyetlien T Tran
(74) *Attorney, Agent, or Firm*—Senniger Powers LLP

(57) ABSTRACT

The present invention is directed to a method and system for use in a computing environment to present and provide access to user information. The system may include a sidebar for hosting a plurality of tiles. Applications may be minimized and inserted into the sidebar upon minimization. Selected features of the application remain available through a tile when the application is represented by a tile in the sidebar. The system may also include user interface tools for allowing a user to command placement of a selected application into the sidebar. The application may include an available feature selection module for allowing an application to provide at least a sub-set of a full feature set upon minimization. An insertion module may be provided for inserting the tile into the user interface.

27 Claims, 17 Drawing Sheets

U.S. PATENT DOCUMENTS

| | | | |
|---|---|---|---|
| 6,300,947 B1 | 10/2001 | Kanevsky | |
| 6,335,745 B1* | 1/2002 | Amro et al. | 715/835 |
| 6,345,358 B1* | 2/2002 | Hall et al. | 713/1 |
| 6,353,451 B1 | 3/2002 | Teibel et al. | |
| 6,356,284 B1* | 3/2002 | Manduley et al. | 715/779 |
| 6,429,883 B1 | 8/2002 | Plow et al. | |
| 6,437,758 B1 | 8/2002 | Nielsen et al. | |
| 6,630,943 B1* | 10/2003 | Nason et al. | 715/746 |
| 6,724,403 B1* | 4/2004 | Santoro et al. | 715/765 |
| 6,738,810 B1* | 5/2004 | Kramer et al. | 709/224 |
| 6,806,892 B1 | 10/2004 | Plow et al. | |
| 7,370,276 B2 | 5/2008 | Willis | |
| 2001/0035882 A1 | 11/2001 | Stoakey et al. | |
| 2002/0057287 A1 | 5/2002 | Crow et al. | |
| 2002/0080170 A1 | 6/2002 | Goldberg et al. | |
| 2002/0186257 A1* | 12/2002 | Cadiz et al. | 345/838 |
| 2003/0011639 A1 | 1/2003 | Webb | |
| 2003/0025737 A1 | 2/2003 | Breinberg | |
| 2004/0066414 A1 | 4/2004 | Czerwinski et al. | |
| 2004/0261037 A1 | 12/2004 | Ording et al. | |
| 2005/0149879 A1* | 7/2005 | Jobs et al. | 715/796 |
| 2007/0288860 A1* | 12/2007 | Ording et al. | 715/779 |

FOREIGN PATENT DOCUMENTS

| | | |
|---|---|---|
| WO | 9532461 A1 | 11/1995 |

OTHER PUBLICATIONS

English translation of Decision on Grant issued in Russian Application No. 2004119830 dated Feb. 2008, 7 pages.

Delaney, Kevin J., (Wall Street Journal) Google Helps Clients Get Personal, Aug. 22, 2005, 1-3 Pages.

Google debuts,, Google Gadgets, May 10, 2006, 1-2 pages.

Google, Sidebar to Launch Monday Aug. 21, 2005, 1-8 pages.

Ziff Davis Media Inc., Apple Previews Mac OSX "Tiger", Jun. 28, 2004, 8 pages.

Ziff Davis Media Inc., Mac 'widget' App Set to Make Windows Debut, Nov. 8, 2004, 1-4 pages.

* cited by examiner

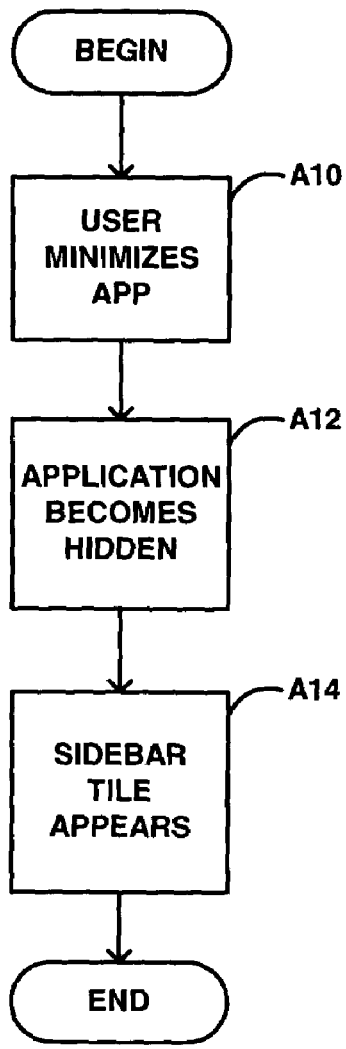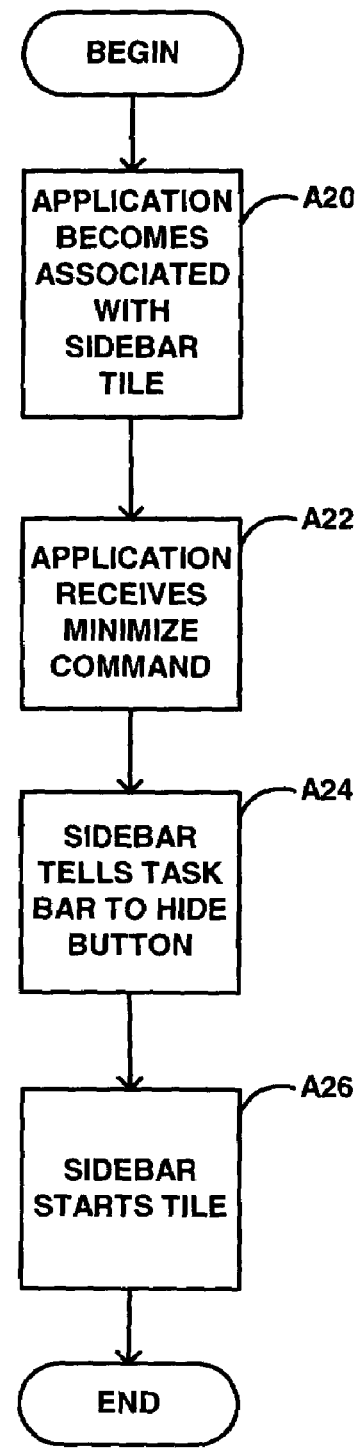
FIG. 2B
FIG. 2C

SYSTEM AND METHOD FOR PROVIDING RICH MINIMIZED APPLICATIONS

CROSS-REFERENCE TO RELATED APPLICATIONS

None

STATEMENT REGARDING FEDERALLY SPONSORED RESEARCH OR DEVELOPMENT

None.

TECHNICAL FIELD

Embodiments of the present invention relate to computing environments. More particularly, embodiments of the invention are directed to a system and method for presenting information for selection and interaction by end users.

BACKGROUND OF THE INVENTION

In today's information saturated environments, such as the Internet, a local or remote computer network, or any combination of the Internet and such networks, it is often difficult for a user to track the potentially large quantities and varieties of interesting communications and information. Such communications and information include, for example, email, instant messaging, file transfers, local weather, appointments, schedules, personal contacts, statistical information, file status, stock quotes, sports scores, local traffic, or any other type of communications or information. This problem becomes particularly acute where the communications and/or information are dynamic, such that rapid, numerous, or large changes to the communications status or channels, or in the information results in out of date communications and/or information that is often relatively useless to a user.

In response to this problem, several conventional schemes have been developed to assist users in keeping track of specific communications or information without requiring a user to manually search or manually check for updates to the communications or information each time the user wants to examine the communications or information. However, such schemes are typically limited by what types of communications or information can be tracked or displayed, by the manner in which the communications or information is accessed or otherwise provided to the user, or by the inability to facilitate sharing of the communications or information between users. Further, conventional schemes that have attempted to address these problems tend to be limited by an inability to provide a single interface that allows for concurrent information retrieval, display or access in combination with communications and communication access points in a dynamic integrated environment. Consequently, users are often left with cluttered displays, which provide access or interaction with either particular types of communications, or with specific information, but not with both communications and information access and interaction in an integrated environment.

Several conventional messaging type schemes have attempted to address these problems. However, such schemes typically provide large windows that take up substantial amounts of screen space. Further, such schemes, while providing some communications capabilities along with some information gathering or display capabilities, tend to separate the communications capabilities from the information capabilities via one or more tabs or the like. Consequently, particular information cannot be easily shared or communicated from within the applications provided by these schemes. Further, such schemes become unwieldy as the amount of information tracked by a user increases, and as the number of communications contacts maintained by the user increases. In particular, as the amount of information increases, the user is forced to scroll through large amounts of data or communications channels.

For example, several conventional messaging type schemes provide capabilities for keeping track of information, such as stock quotes, weather, news, or other information via the Internet or some other local or remote network, or some combination thereof. Further these conventional schemes also provide for communications access such as, text instant messaging, file transfer, email, etc., via one of a number of communications channels for contacts in one or more groups of contacts. Consequently, a user is able to keep track of information and communicate with particular entities. Unfortunately, with these schemes, the user cannot do both simultaneously. He is forced to tab between the different types of information and the communications capabilities. Therefore, the user is unable to share data observed via the information tabs with contacts in the communications tab unless the user manually saves or copies the information, switches tabs, then manually creates a message to a particular contact, and either attaches or pastes the information to that message.

Further, because these conventional schemes tend to have numerous tabs, they require a fairly large window in order to display the information and associated controls or icons. Unfortunately, such windows become buried under other application windows when the user is using other applications. Consequently, the user is often forced to interrupt the flow of work to switch between windows. This problem has been addressed by some schemes that provide an option to maintain an open message window. While this scheme solves the problem of burying the messaging window, the messaging window then occludes a potentially large part of any other open application window. While it is possible to manually resize the different application windows and to move them around the screen in an attempt to give each window its own space, such manual user intervention can be both time consuming and aggravating for the typical user.

At least one conventional scheme has attempted to address some of the aforementioned problems. This scheme provides an application that allows a user to customize at least one icon in a scrollable strip along one edge of a computer display device. This scheme provides iconized links to particular information sources and uses conventional techniques to populate each customized icon with information retrieved from the information sources. However, this scheme has several important limitations.

While this scheme provides for gathering and providing information to a user, it fails to provide the level of communications capabilities offered by messaging schemes. For example, this scheme does not provide for initiating communication via an icon, so while an icon may provide a communication status, such as a number of received messages, it does not provide for responding to such messages. Further, this scheme does not provide for nesting or otherwise organizing groups of icons in order to aggregate multiple icons. In other words, opening the window associated with one icon does not provide access to further levels of grouped icons. Consequently, it is difficult to organize icons where a large number of icons are used. In addition, the icons of this scheme are not easily transportable and no real mechanism exists for transferring icons between users. Instead, users are required to obtain the icons from an application used for managing the icons. Other limitations of this scheme include a lack of an ability to resize the window containing the scrollable strip used for displaying the icons. Further, with this scheme, if a user adds too many items, another row or strip is automatically created within the window, even if that row has only one icon, thus resulting in a waste of valuable display space.

A related scheme allows a user to customize a scrolling ticker type display window to provide continuously updated scrolling information from a predefined set of available information. While useful, this scheme is more limited than the prior scheme for several reasons. First, the set of information that is available to this scheme is predefined. Thus, if the information type and source are not listed as options, they are not available. However, users are provided with limited control over certain information options, such as, for example, specific stock symbols for stock quotes, choosing areas or topics of news to generate an automatic alert, or choosing particular cities to generate a weather report. Another limitation is that users are not able to add or edit information sources, such as by modifying the icons as described above. Furthermore, since the ticker scrolls, there is no guarantee that all the information of interest will be visually available at any given time. Specifically, if the information of interest to a user is not currently visible, the user must wait until the information scrolls into view. Consequently, this scheme can become very distracting as the user is forced to watch the display constantly. Further, because the scrolling ticker is in constant motion, it is in itself potentially very distracting to a user as it creates a persistent motion in the user's peripheral vision. Finally, the communications capability of this scheme is minimal in comparison to the aforementioned messaging schemes.

Still other schemes for providing custom information views or displays involve a technique known as "web scraping." In general, such schemes allow a user to specify particular portions of unique Internet Web pages, i.e., source web pages, to be displayed on a single customized web page. Consequently, while such schemes provide for information retrieval and display, they do not provide for communications capability.

For example, one web scraping scheme allows users to "clip" relevant data and content from various Internet web sites and pull it all together in one dynamic browser page, called a "view." This view is effectively a composite web page. Thus, as any of the source web pages are changed, the composite web page is automatically updated. This scheme allows users to edit views in a variety of ways, such as by adding, deleting and rearranging data elements and personalizing the view with the user's own inputs. In addition, this scheme provides a method for transferring views between users. However, this scheme suffers from many of the same basic limitations described above with respect to the aforementioned schemes. Such limitations include an inability to nest or organize views and arrange for a plurality of views to be displayed simultaneously. Also, as mentioned above, such schemes typically provide minimal communications or messaging capabilities.

The web scraping technique also requires views to be opened in a window that occupies a substantial portion of a display device. In addition, the content of typical web pages is typically not designed to minimize the area in which information is displayed, resulting in an inefficient use of screen space. Further, if a portion of the web page that is scraped or otherwise clipped from an existing web page includes an animation, the web page can be distracting if it's in the user's peripheral vision. Finally, because the web scraping technique is a patchwork of distinct elements, the composite web page resulting from this technique is typically an unappealing jumble of disparate elements that were never visually designed to appear together on a single page.

In some instances, a user may want to be aware of real-time information and notifications. Conventional user interface systems do not provide a solution that adequately addresses both of these needs, while also providing the user with flexibility, ease of use, and choice in configuration.

Even further, users frequently need to use controls or other application interfaces that are independent of their current task. In those cases, a user has to switch from a current task window to another window or application. For example, if a user was using a word processing package and wanted to change a compact disk track or other such task, the user would need to access the controls of a media player application program, which typically is displayed in a different window. An example of this is the WINDOWS MEDIA PLAYER in an environment such as the Window Operating System.

A new system and process are needed for automatically providing dynamic communication access and information awareness in an interactive peripheral display without requiring a user to tab between communications channels or information types. Further, such a system and process should not require a user to choose from a predefined list of communication access points and information categories or sources, but instead should allow for creation and customization of communications access points and information sources. Such communications access points should include communications channels for contacting other entities, and the display of information from multiple applications. The information sources should include any desired information elements, such as, for example, specific information types or information categories. In addition, this system and process should allow users to organize any desired information sources into any desired number of groups or nested groups. Also, these groups or nested groups should be capable of being expanded by the user to allow the user to view nested groups or communication access points or information elements within these groups or nested groups. Finally, this system and process should reduce clutter and increase consistency in the user display, while providing live information, and a platform for frequently used controls.

BRIEF SUMMARY OF THE INVENTION

Embodiments of the present invention are directed to a method and system for use in a computing environment to present and provide user access to information. A scheme is provided for presenting frequently used controls and information.

In one aspect, the present invention is directed to a method in a computing system for providing a user interaction scheme. The method comprises minimizing an application upon receiving a user command, revealing a tile to represent the minimized application, and providing access to selected application features through the tile.

In another aspect, the present invention is directed to a method in a computing system for providing a user interaction scheme through the use of a sidebar. The method includes moving an application to the sidebar upon receipt of a user command to minimize the application and providing access to selected features belonging to the application from the minimized application in the sidebar.

In yet another aspect, the present invention is directed to a system for providing user access to a variety of informational items. The system includes a sidebar for hosting a plurality of tiles and at least one application including an insertion module for inserting a tile into the sidebar, wherein selected features of the application remain available through the tile when the application is represented by a tile in the sidebar. The system additionally includes user interface tools for allowing a user to command placement of a selected application into the sidebar.

In a further aspect, the present invention is directed to a system for providing access to a minimized application through a user interface. The system includes an available feature selection module for allowing an application to provide selected application features upon minimization and a tile insertion module for revealing a tile for providing access to a full set of application features, a sub-set of features, and/or additional features not ordinarily available in the application.

BRIEF DESCRIPTION OF THE SEVERAL VIEWS OF THE DRAWING

The present invention is described in detail below with reference to the attached drawings figures, wherein:

FIG. 2B is a flow chart illustrating addition of a rich minimized application to a side bar from a user perspective in accordance with an embodiment of the invention;

FIG. 2C is a flow chart illustrating addition of a rich minimized application to a sidebar from a system perspective in accordance with an embodiment of the invention;

DETAILED DESCRIPTION OF THE INVENTION

Embodiments of the present invention are directed to a system and method for providing a user interface allowing a user to access important features of an application even when the application is minimized. When the application is minimized, a tile representing the application appears in a sidebar. The sidebar allows for automatic or user directed addition or removal of tiles. Even further, the sidebar visibly shrinks its content display, to provide users with a preview of the positioning and appearance of a newly added tile. Further still, an overflow area may be provided for icons that represent tiles that could not fit within the sidebar.

Having briefly provided an overview of the present invention, embodiments of the invention will be discussed with reference to FIGS. 1-10. An exemplary operating environment for the present invention is described below.

Exemplary Operating Environment

Figure 1:
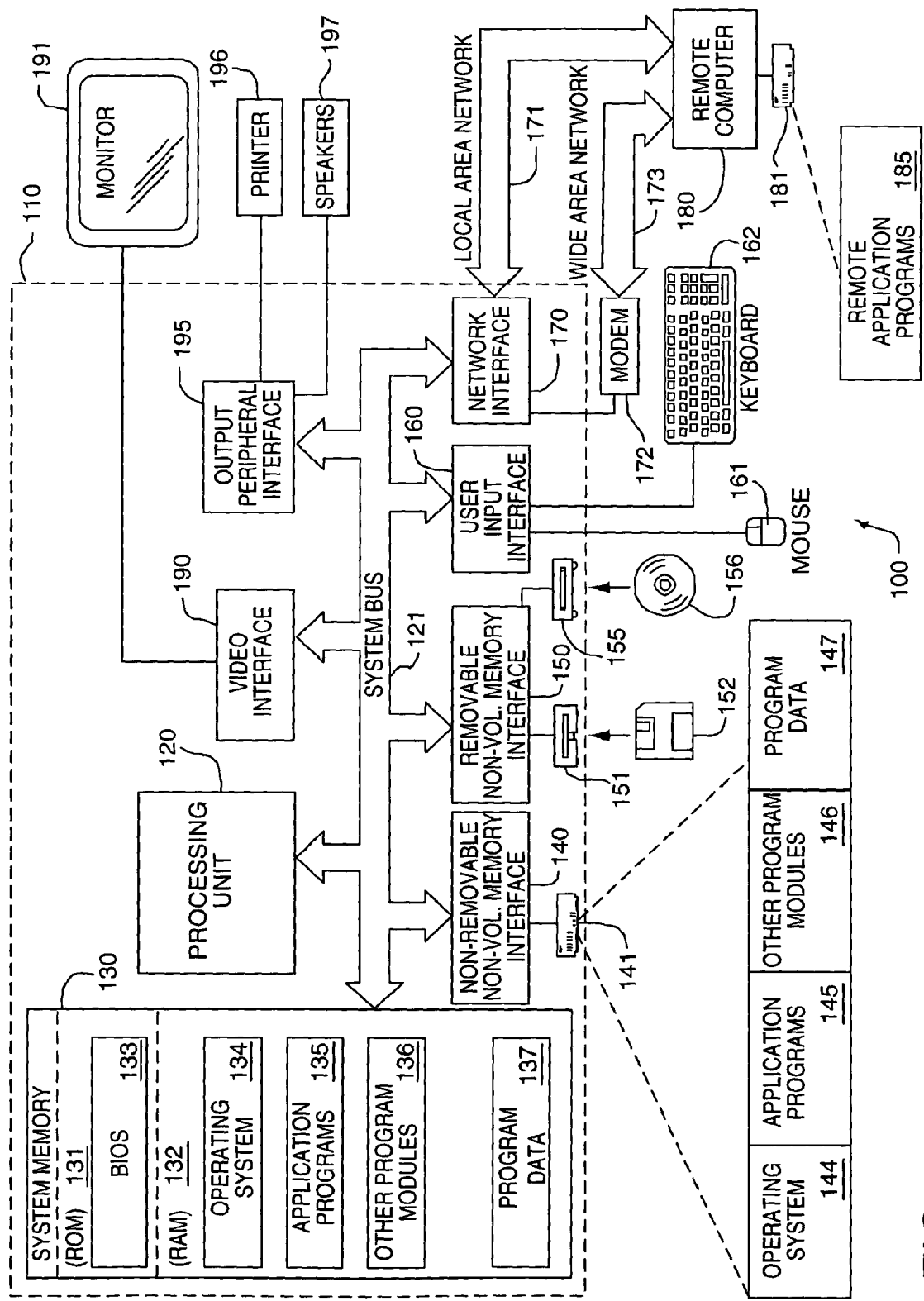
FIG. 1 is an exemplary computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

User Interface Sidebar

A "sidebar" as referenced herein is distinct from the currently known "taskbar". As used herein, a sidebar refers to a persistent display strip along one or more edges of a conventional display device. A tile is a dynamic thumbnail or "item" comprising, a combination of a description of information of interest and a "viewer" for displaying whatever information is represented. A more detailed description of the sidebar and the tile, which is otherwise referred to as a ticket, can be found in the application for letters patent, Ser. No. 10/063,296, filed Jun. 8, 2001 which is hereby incorporated by reference. Various features of the sidebar are described in U.S. patent application Ser. No. 10/423,597, filed on Apr. 25, 2003, which is also hereby incorporated by reference.

As previously mentioned, conventional user interface displays restrict information that they present to a user. Such systems typically provide a task bar from which a user is able to activate an application window of interest in order to interact or obtain information. Various control types are utilized by such conventional prior art systems to present information to a user. Some of these control types include scroll bars, expandable short lists, start menus, dashboards, and controls that cause only active items to be visible. An example of a conventional user interface is illustrated in FIG. 10 and generally referenced as display 1000.

Figure 10:
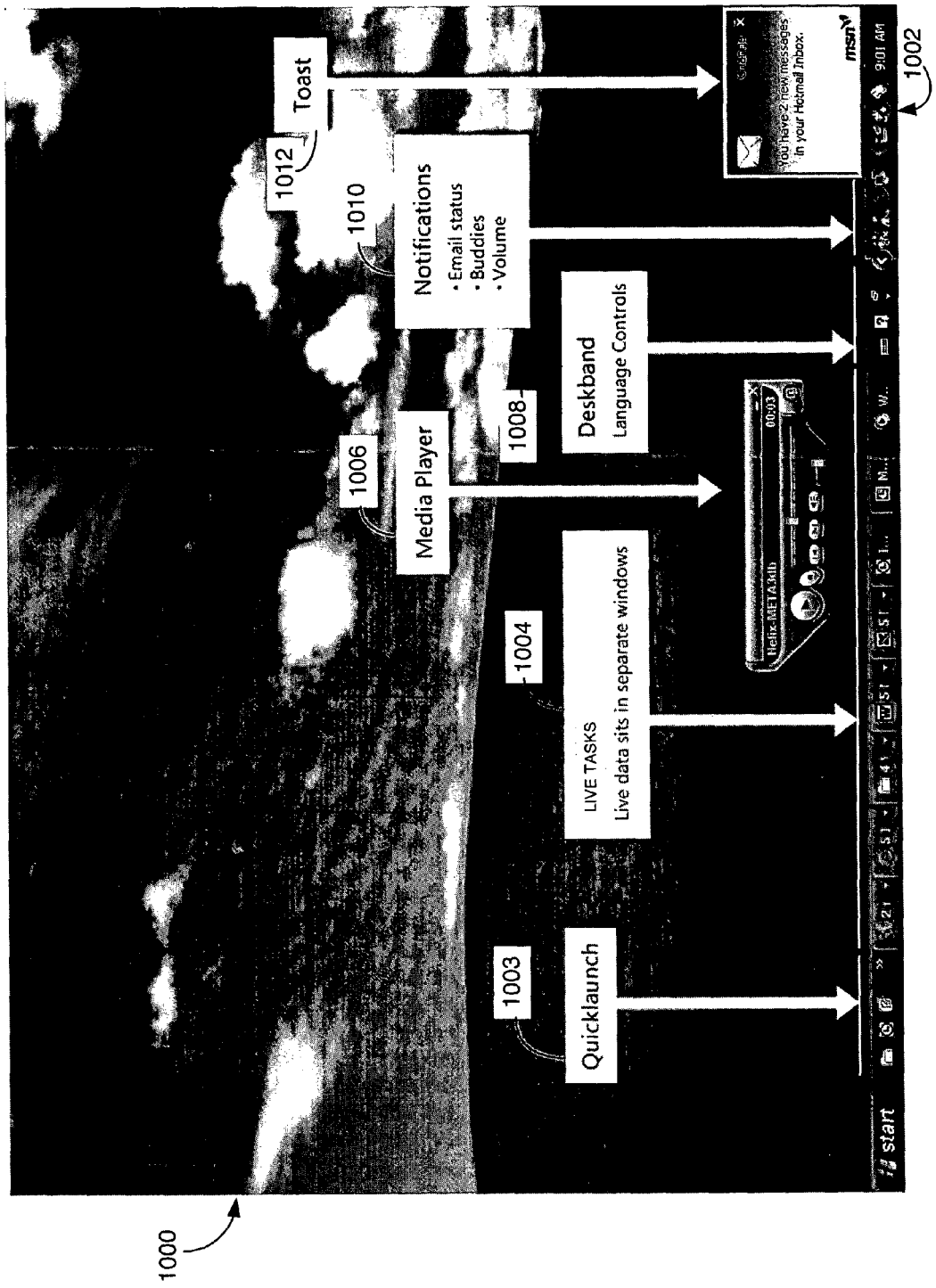
FIG. 10 illustrates an embodiment of a task bar as known in the art.

As shown in FIG. 10, display 1000 includes a taskbar 1002. Generally, taskbar 1002 may contain a variety of task groupings or sections that provide access to applications or features of the operating environment through icons. For example, a section of taskbar 1002 may provide a quick-launch section 1003. Quick-Launch section 1003 enables the launching of one or more application programs such as a word processing application program, electronic mail program, or any other programs on the computing system that may have been appropriately configured to start from quick launch section 1003.

Another section of taskbar 1002, such as live-tasks 1004, may list currently executing tasks. From live-tasks 1004, a user may access a display window that is associated with a program in order to interact with program specific live data. An example of such a window is the media-player 1006 window. Using the media-player 1006 window, a user can view live information regarding the currently playing media and direct the actions of the media player at the user's discretion.

Yet another section of taskbar 1002 may be a desk-band 1008. Desk-band 1008 is an example of language controls for the operating environment.

A section of taskbar 1002 may also contain notifications 1010. Notification area 1010 provides icons relating to application programs or system level communications. For example, electronic mail status, chat group buddies or even volume control can be accessed through icons in the notifications section 1010.

In an attempt to provide live status information, taskbar 1002 provides for a toast 1012. Toast 1012 is essentially a pop-up window that provides communication from an application program. For example, as shown a pop-up message is displayed informing the user that there are messages in an inbox.

When a significant amount of information is available, taskbar 1002 can become quite cluttered. Furthermore, the various types of icons available to an end user are inconsistent. Even further, taskbar 1002 does not easily provide a user with information and controls that the user may need to immediately access. Further still, taskbar 1002 involves a multiple step approach to access any information. For example, to get access to a volume control, a user must first select the volume control icon from the notifications section 1010. This causes a volume control to be displayed. The user can then adjust the volume to the desired level.

Figure 3:
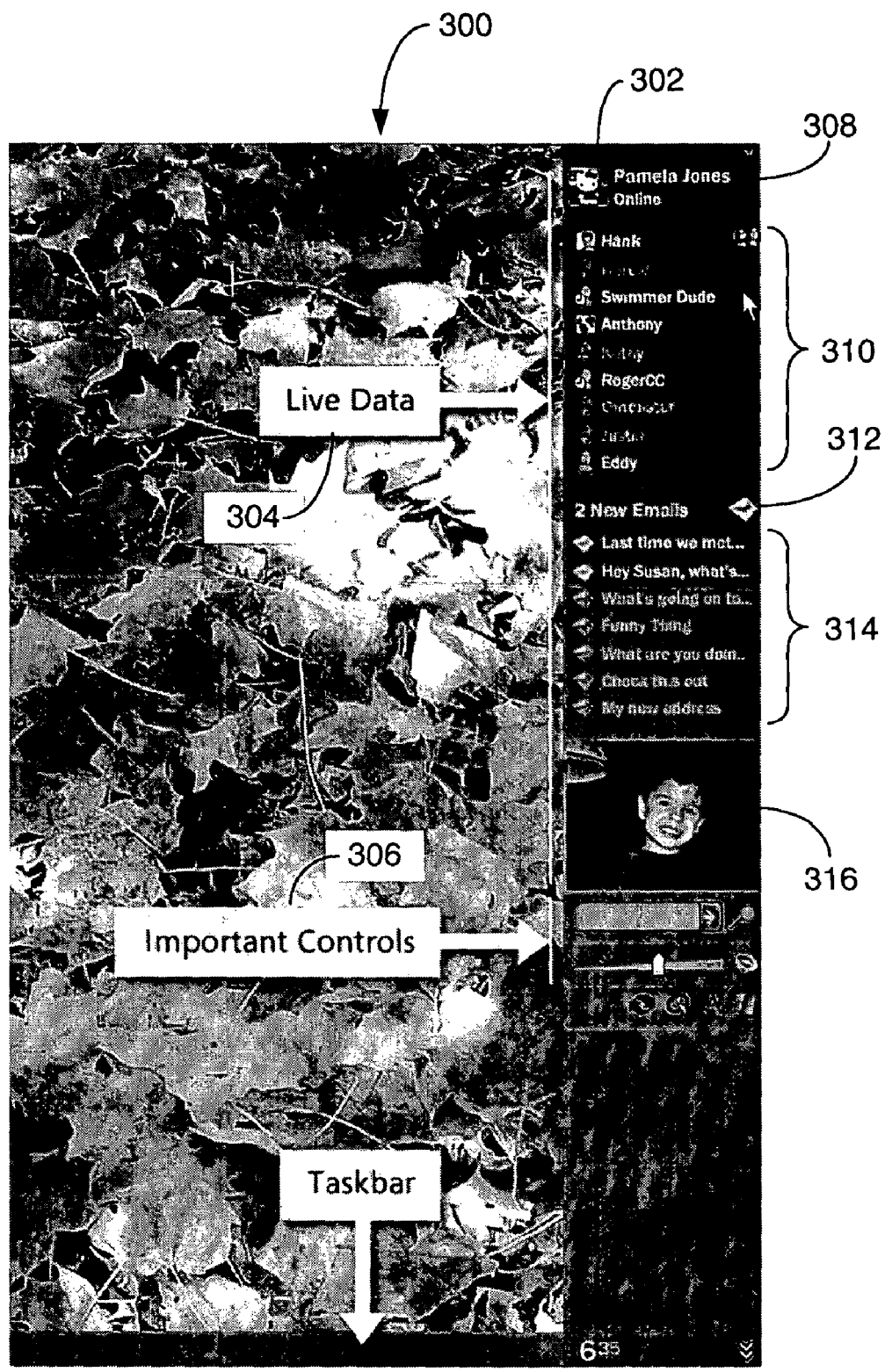
FIG. 3 is a screen shot illustration of a sidebar for practicing the present invention.
Figure 4:
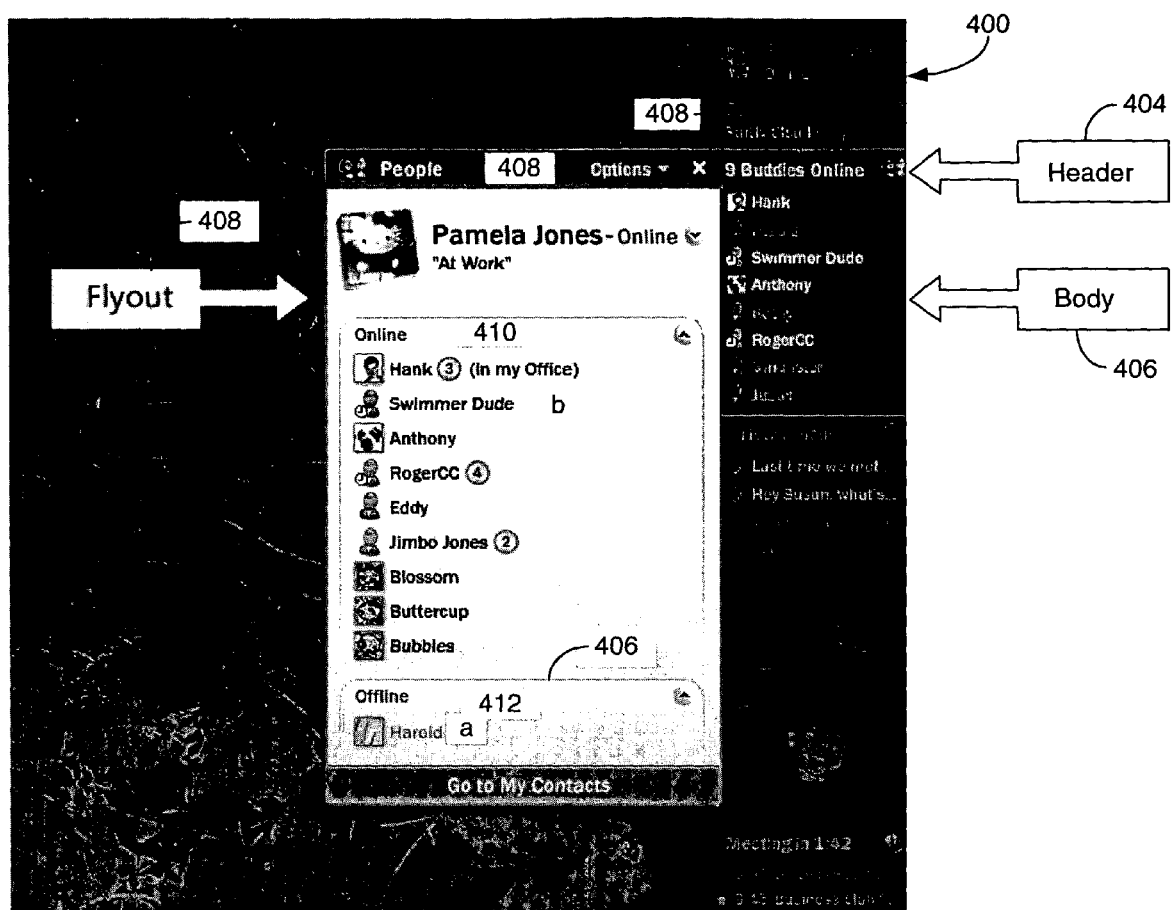
FIG. 4 illustrates a flyout of a tile from the sidebar of FIG. 3.

A user interface configuration in accordance with an embodiment of the invention is shown in FIG. 3. Shown in display 300 is a sidebar 302. Sidebar 302 may include a live-data area 304, for live information of interest to the user, as well as a platform important-controls area 306, for frequently used controls. Within live-data 304, there may be a plurality of tiles related to a plurality of applications and information items. Important-controls 306 may also contain tiles for any one or more items used in controlling system or application parameters.

Live-data 304 contains for example, a 'Pamela Jones Online' tile 308, which may provide access to Internet or network applications, or other functions including messaging, chat, email and browsing. 'Pamela Jones Online' tile 308 further contains individual contact tiles 310. Some of the individual contact tiles 310, for 'Pamela Jones Online' 308 are also displayed within live-data 304. In other words, 'Pamela Jones Online' tile 308 may be thought of as a header and the individual contact tiles 310 would be considered the body. Another example of live-data 304 is the email notification tile 312, which contains a listing of emails 314. As shown, email notification 312 indicates that there are two new mail messages. Correspondingly, the top two email listings 314 are highlighted to indicate that they are new and unread. Yet another example of live-data 304 is a video tile 316, which is updated in real time within the sidebar 302. Sidebar 302 can located in a variety of ways and can provide varying information.

A user has the ability to modify the sidebar 302. A user can add, remove, resize tiles or perform other manipulations of the displayed tiles as necessary. When a tile is added, the sidebar determines if the total display area to be occupied by all tiles, including the new tile will exceed the display area of the sidebar. If all the tiles will all fit into the sidebar, then the new tile is added to the sidebar and displayed. On the other hand, if the new tile will not fit at its default size, then all the tiles are compressed or "squished". Thus, both existing tiles and the new tile are scaled down in size within the sidebar. The new tile is shown in a preview state, which may not necessarily show the complete content of the tile. If the previewed tile has a natural size that is too large, the tile may be cut off in addition to being scaled down. At the conclusion of the preview, the new tile grows to its natural size and may remain in the sidebar or be moved into an overflow area as discussed later in this document. Other tiles in the sidebar are typically scaled down. The tiles are reduced to the extent necessary for all of the tiles to visibly fit within the sidebar 302.

The system applies any one of a number of criteria to select which tiles and how many of them would need to be removed from the sidebar to enable the remaining tiles to be displayed at their default sizes. Concurrent with the removal of any tile, an icon is created to represent the removed tile. The icon may be placed in an overflow area (not shown) located in an area of the sidebar 302. With the 'excess' tile(s) removed, the remaining tiles may be expanded to their default sizes.

The expanded view of a tile can vary depending on the type of tile and the tile's other contents. For example, as shown in screen illustration 400 of FIG. 4, 'Pamela Jones Online' tile is shown in a flyout 408. Within the flyout 408 there are two categories of displayed information. A first category is the online group 410, which may have one or more online individual contacts and groups, 410. The second category is the offline group 412, which may have just an individual contact. When the information for 'Pamela Jones Online' is displayed within the sidebar 402, the body 406 includes individual contacts from both the online group 410 and the offline group 412. In other words, the two categories of the flyout 408 are blended in the sidebar 402. For example, offline contact 412A (Harold) is included within the body 406 of sidebar 402 and is displayed as individual contact 406B (Harold) in flyout 408.

Tiles might be added to the sidebar in an automatic or user request mode. Automatic addition may occur in conjunction with the installation of application programs and with the operation of transient controls. User requested tile addition occurs through a tile configuration user interface program or by user designation within an application program. The mode of tile addition determines the priority and consequently the position of the tile within the sidebar.

Figure 7A:
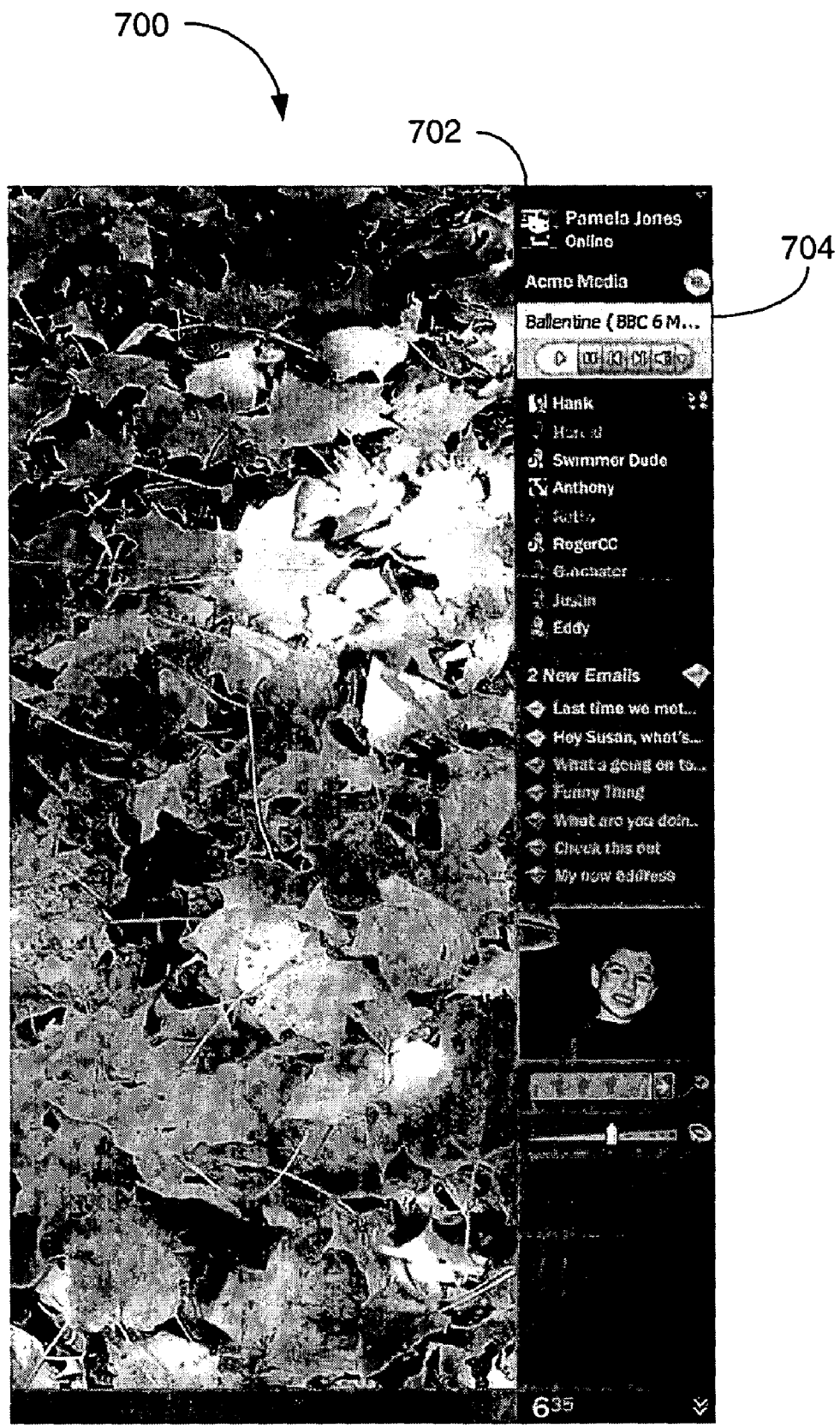
FIG. 7A illustrates a sidebar with tiles displayed in the default size.
Figure 7B:
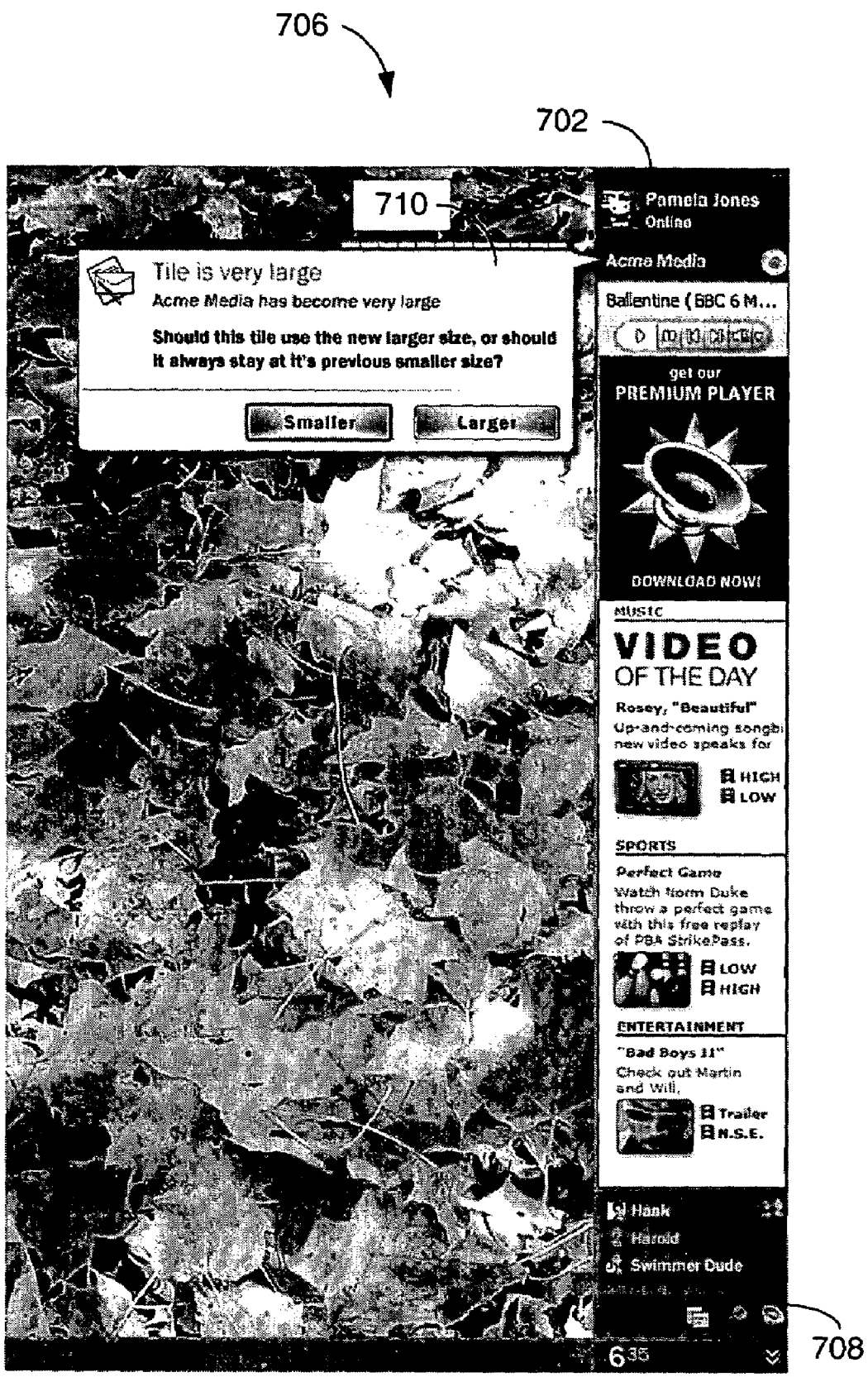
FIG. 7B illustrates the sidebar of FIG. 7A with one of the tiles having been resized.

With regard to automatic tile addition, when an application is being installed, the associated new tiles are added to the bottom of the sidebar. In an embodiment of the present invention, users are given an opportunity to preview the sidebar. Users can see what the sidebar will look like, once the new tile has been added. For example, as shown in FIG. 7A, the addition of an electronic mail inbox tile 704 to the sidebar 702, results in a user prompt 706. With the aide of prompt 706, the user may selectively cause the inbox tile 704 to remain as shown within the sidebar 702 or be hidden. Similarly, in FIG. 7B, the user is prompted about adding the calendar tile 708 to the sidebar 702. When the user selects to show the new tile in the sidebar, the new tile is added to the bottom of the sidebar. This effect is illustrated in FIG. 7C, wherein electronic mail inbox tile 704 and calendar tile 708 are placed at the bottom of the sidebar 702. It should be understood that placement of tiles within the sidebar may vary according to other aspects of the present invention.

Figure 8:
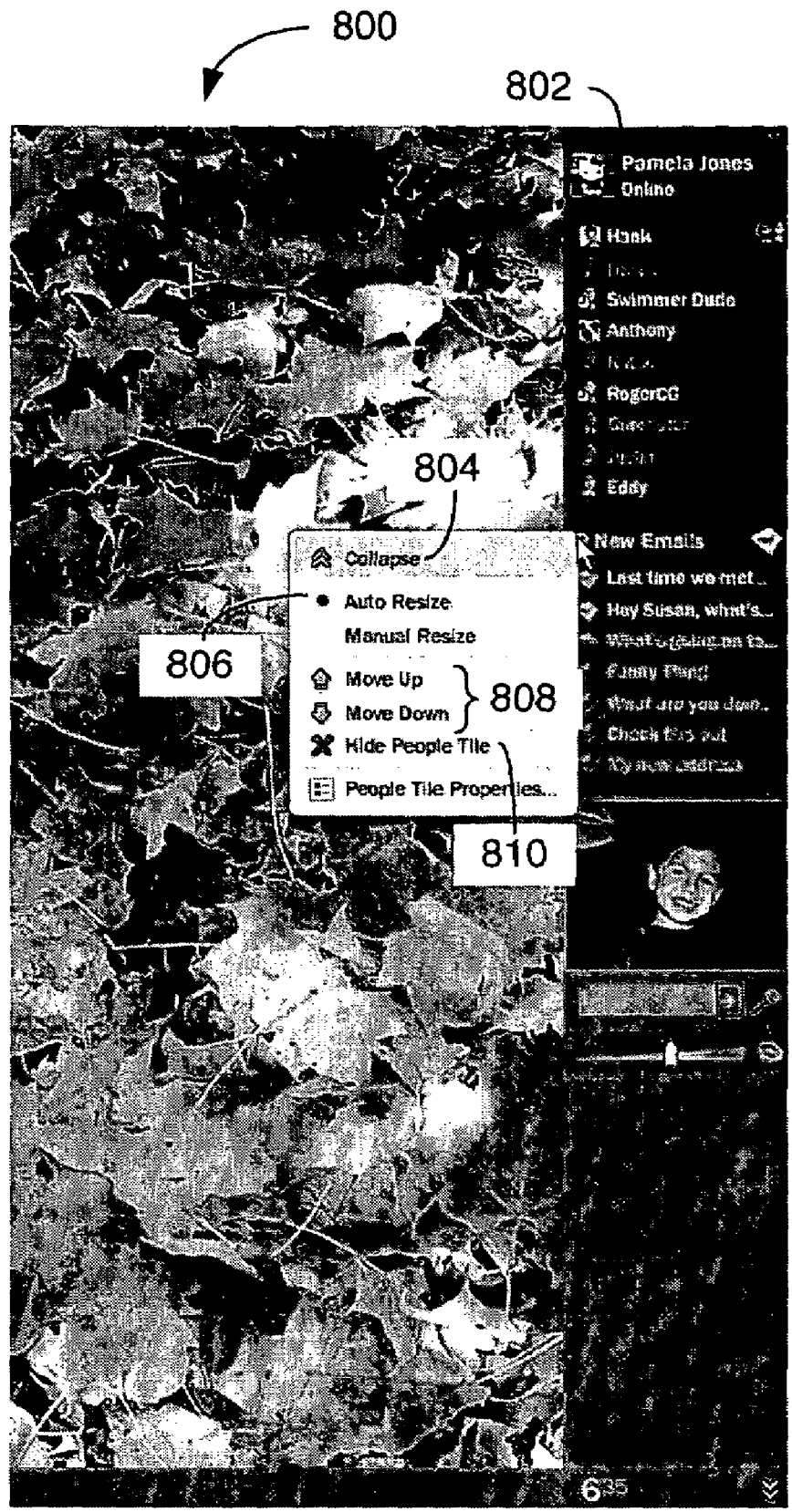
FIG. 8 illustrates a sidebar along with an exemplary menu of options that may be available to a user for customizing the sidebar.

FIG. 8 illustrates tools provided to allow a user to rearrange or resize tiles, to relocate the sidebar, and to minimize the sidebar while retaining access to tiles. A display 800 may allow a user to select one of many custom options for any tile within the sidebar 802. For example, a user may collapse the tile by use of the option 804, enable automatic or manual resizing with option 806, relocate the tile up or down relative to the other tiles in the sidebar with option 808, or simply hide the tile using option 810.

As evidenced by the aforementioned explanation, a taskbar and a sidebar are separate and distinct concepts. The taskbar stays focused on managing windows for applications that consume large amounts of space and are full-fledged applications. One-to-one relationships between windows available and items in the taskbar. When a user shuts down a computer, all of the running applications in the taskbar close and will not be in the taskbar upon the next login. Additionally, as set forth in detail below, minimized full-fledged applications housed in the sidebar have functionality that is not available when these applications are minimized in the taskbar. Furthermore, the sidebar can contain information in addition to full-fledged applications. Furthermore, the information in the sidebar is customized. After a user shuts down the computer, the applications will remain in the sidebar upon the next login.

Transient Tiles and Rich Minimized Applications

Some of the tiles shown in the sidebar described above remain present in the sidebar and are not available outside of the sidebar. Other tiles, known as transient tiles may include applications that exist outside the sidebar and are only present in the sidebar upon user request. For instance, a user can request that an application appear in the sidebar when it is minimized. The minimized application in the sidebar can provide basic functionality of the application without consuming excessive space. An application with this capability is referenced herein as a "rich minimized application" or "RMA".

Figure 2A:
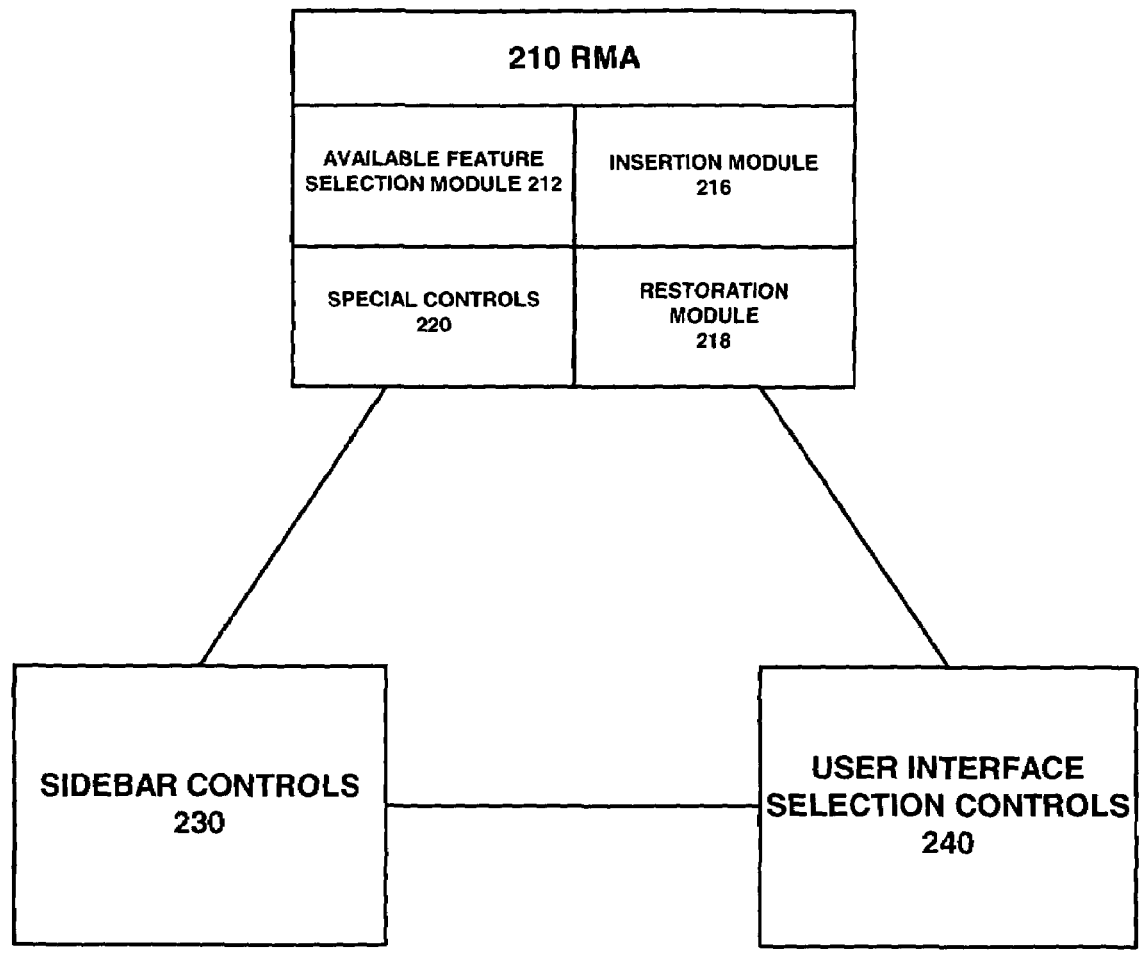
FIG. 2A is a block diagram illustrating specific components of a system of an embodiment of the invention.

FIG. 2A illustrates a system for implementing an embodiment of the invention. The system operates within a computing environment such as that shown in FIG. 1 and includes a rich minimized application 210, sidebar controls 230, and user interface selection controls 240.

The rich minimized application 210 is an application that is capable of providing important features even when the application is minimized. Using an available feature selection module 212, the rich minimized application 210 selects those features that are most likely to be utilized by a user when the application 210 is minimized. Many applications have some set of features that are useful to a user even when the application window is minimized. This feature selection module 212 is capable of determining which features are so important that they should be available on screen even when the application 210 is minimized. The features selected by the module 212 may be or include a sub-set of the original feature set, the entire original feature set, or additional features not included in the original feature set.

An insertion module 216 may control the insertion of a tile into a sidebar or other user interface mechanism in which the application 210 resides after the application 210 is minimized. A restoration module 218 may be provided to enable the application 210 to be restored from its minimized condition. Special controls 220 may also be provided. The special controls 220 preferably include a rich minimized application header having a restore button. The restore button may hover next to the minimized application tile. A right-click menu for the application 210 may include commands including "restore", "maximize", and "close". The special controls 220 may additionally include a "remove from bar" option. The "remove from bar" option preferably includes a dialog box with a message such as "Removing this tile will prevent the application from minimizing to the sidebar in the future". The user will have the opportunity to select "OK" or "Cancel".

Aside from its special controls, an application 210 should exhibit the same behavior as any other transient tile. After a reboot or logout, a minimized application 210 should remain in the sidebar. The tile for the application 210 may be responsible for restarting any processes and the application 210 should also be able to tell the sidebar which application should be launched upon receiving a user command for restoration.

The user interface selection controls 240 include selection tools to enable the user to determine which applications minimize to the sidebar, where the UI is placed, and how much space the applications consume. The sidebar controls 230 may watch to see when the window is minimized. The sidebar controls may hide and reveal the application's window, the taskbar button for the application, and the application's alt-tab entry as needed.

Using the aforementioned components, an application that wants to offer controls and information to the user even when it's minimized can insert a rich minimized application tile into the sidebar. For instance, an application such as a media player could offer controls such as play/pause and information such as song name while the application is minimized in the sidebar. When the user minimizes the application by clicking on the minimize button or other method, the main application window vanishes and a tile appears in the sidebar. The tile provides some information and controls that were in the main window so that the user still has access to them even though the window is minimized.

Applications that may provide such functionality include such applications as a clock, a virus checker, or a list of buddies online. An email program may be minimized, but may provide access to specific emails. A TV window may offer videos. A media player may be offered with limited functionality, such as a pause or play bar, in the sidebar. In an embodiment of the invention, the applications that are minimized to the sidebar decide which controls are offered in the minimized state, but the user determines how much room the application can take in the side bar. In additional embodiments, the application determines the controls and/or the space occupied unless the user decides to regulate these features.

Figure 2D:
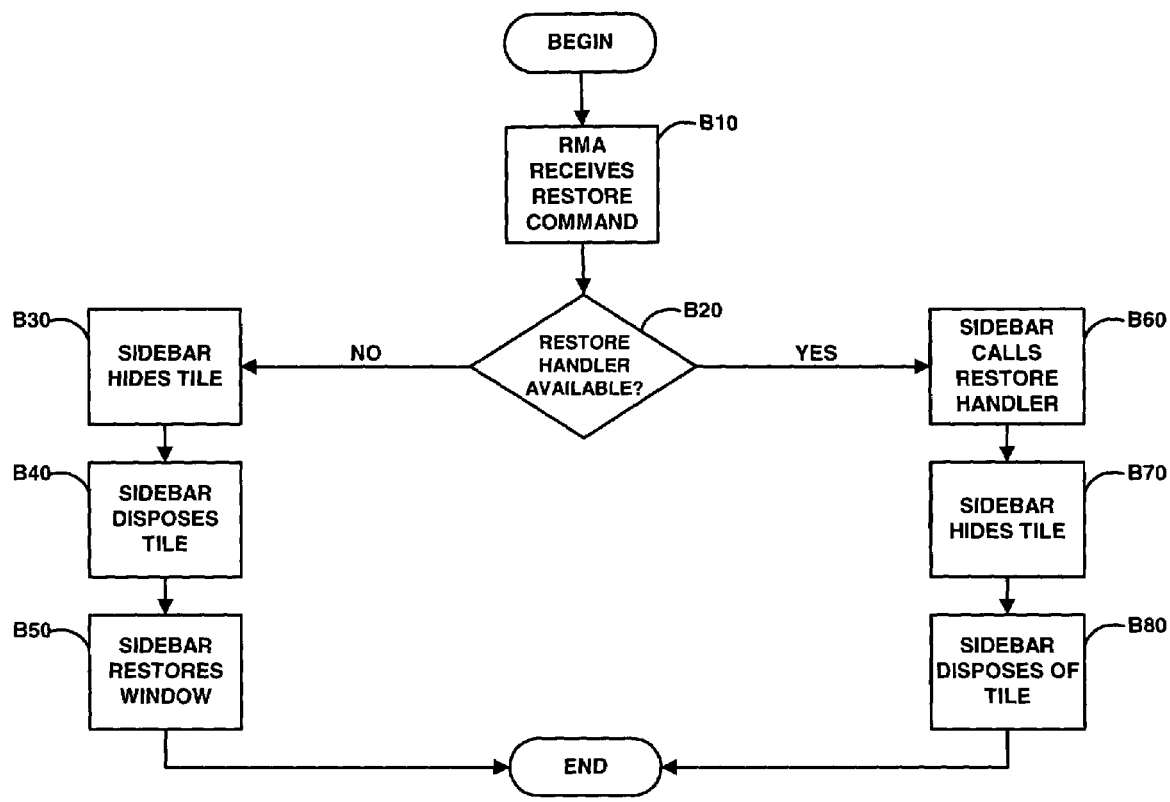
FIG. 2D is a flow chart illustrating restoration of a rich minimized application.

FIGS. 2B, 2C, and 2D illustrate the process by which the application 210 appears and disappears from the sidebar in accordance with an embodiment of the invention. FIG. 2B illustrates procedures implemented from a user perspective for minimization of the application 210. In step A10, the user minimizes the application 210. In step A12, upon receiving a command from the user in step A10, the application becomes hidden. In step A14, the sidebar tile becomes visible to the user.

FIG. 2C further illustrates the process from a system perspective. In step A20, the application implements a routine to become associated with a sidebar tile. The routine implements a tile identifier and a string to obtain the tile, and also optionally a pointer to the application's window. In step A22, the application receives a minimize command from the user. In step A24, the sidebar watches to see when the window is minimized. The sidebar hides the taskbar button for the application and the application's alt-tab entry and shows the tile in step A26.

FIG. 2D illustrates procedures for restoring the application 210 after it has been minimized in the sidebar. In step B10, the application 210 receives a restore command from the user. The user can make the command by clicking a restore button in the tile. In step B20, the application determines if a restore handler such as the restoration module 218 is available. If the tile has implemented a restore handler, the sidebar calls the restore handler in step B60 on a separate thread and hides the tile in step B70. In step B80, the sidebar disposes of the tile on the original thread after restoration is complete.

If in step B20, if the tile has not implemented a restore handler, the tile UI is hidden in step B30 and the sidebar disposes of the tile in step B40. In step B50, the sidebar restores the application window, the taskbar button, and the alt-tab entry. From a user perspective, if the user wants to switch back to the larger window, in an embodiment of the invention, the user can select the restore button in the tile. The restore button may be unique to RMA tiles. The selection of the restore button re-opens the application window and removes the tile from the sidebar.

If a user does not want an application 210 to minimize to the sidebar, the user can select the "Remove from bar" option available in a context menu or in an Add/Remove tiles page.

Selection of "remove from bar" will prevent the application 210 from minimizing to the sidebar. The user may be provided with a confirmation in this case to ensure that the user wants to remove the tile and not merely close the tile. The user can re-add the application 210 from an Add/Remove page and the application 210 will again be allowed to minimize to the sidebar.

The sidebar provides several functions for an application that minimizes to an RMA. When the application minimizes, the sidebar controls 240 may zoom to the sidebar rather than the taskbar. The sidebar controls 240 will remove the window's button from the taskbar and will remove the entry from the Alt-tab menu. When the window is restored, the sidebar will ensure the taskbar button and Alt-tab entry show again.

The system and method of the present invention can handle a variety of tiles. Some tiles may be visibly present all of the time. A transient tile, such as the tile representing an RMA, is one that only appears as needed or as requested by a user. The operations of a transient tile are best explained by way of an example, as shown in display 500 of FIG. 5A. The last tile shown within the sidebar 502 is a volume control tile 504, below which there is an overflow area 506. When a transient progress bar tile 508 (FIG. 5B) is needed, the tile is added to the sidebar 502, causing the sidebar 502 to become compressed or squished to make room. This squished effect is illustrated in display 507 of FIG. 5B.

Figure 5A:
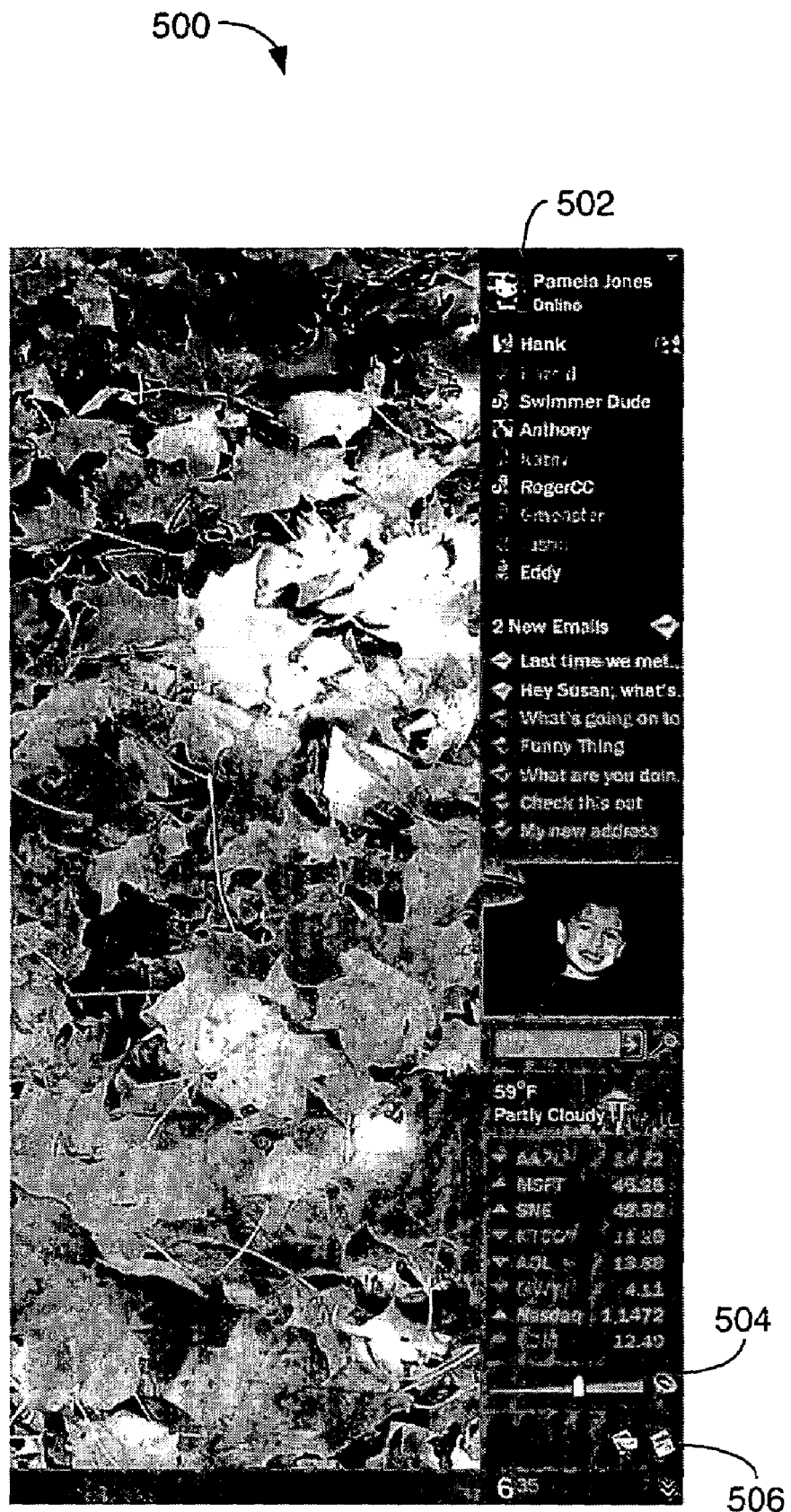
FIG. 5A illustrates a sidebar prior to the appearance of a transient tile.
Figure 5B:
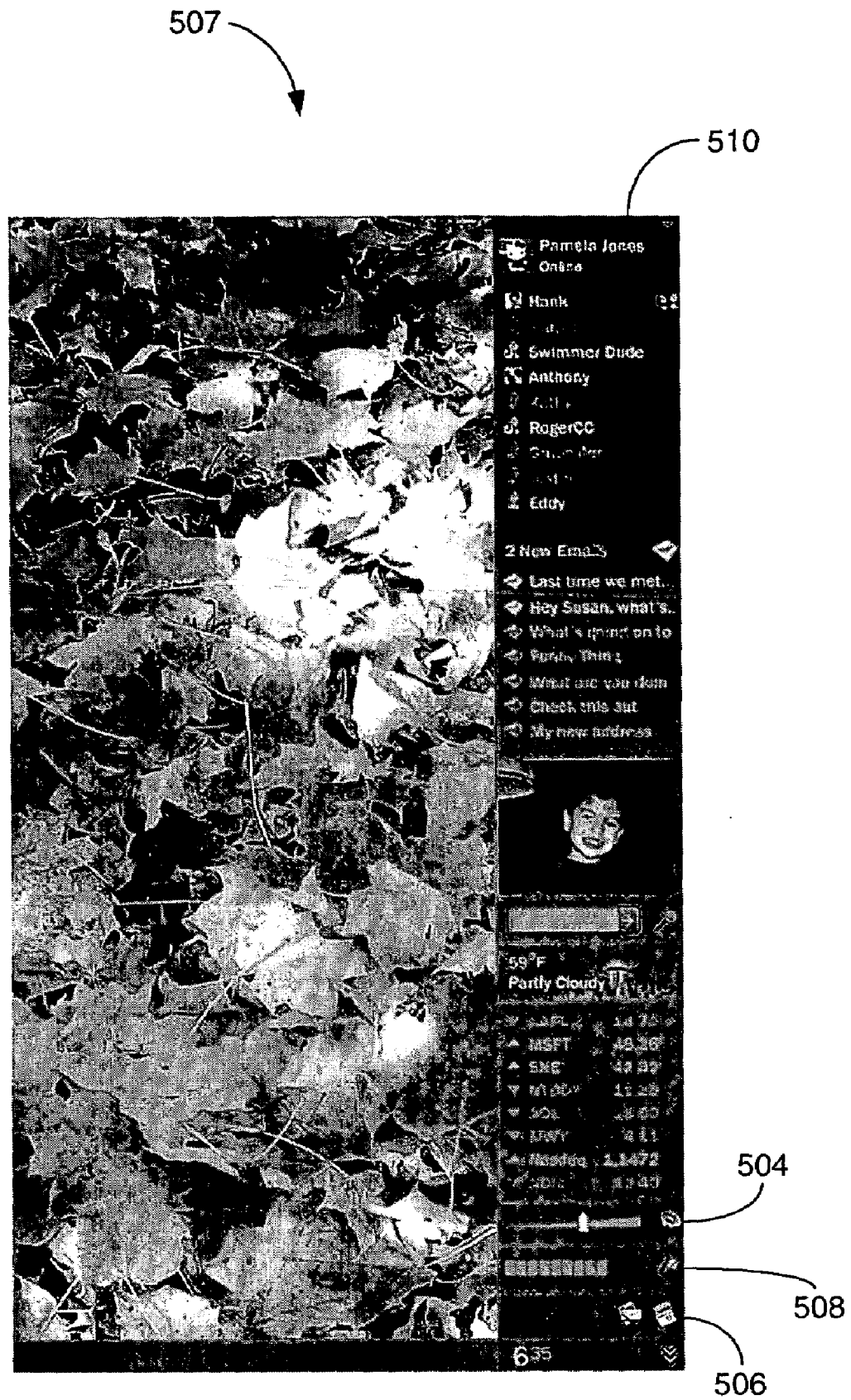
FIG. 5B illustrates the sidebar of FIG. 5A including a transient tile.
Figure 5C:
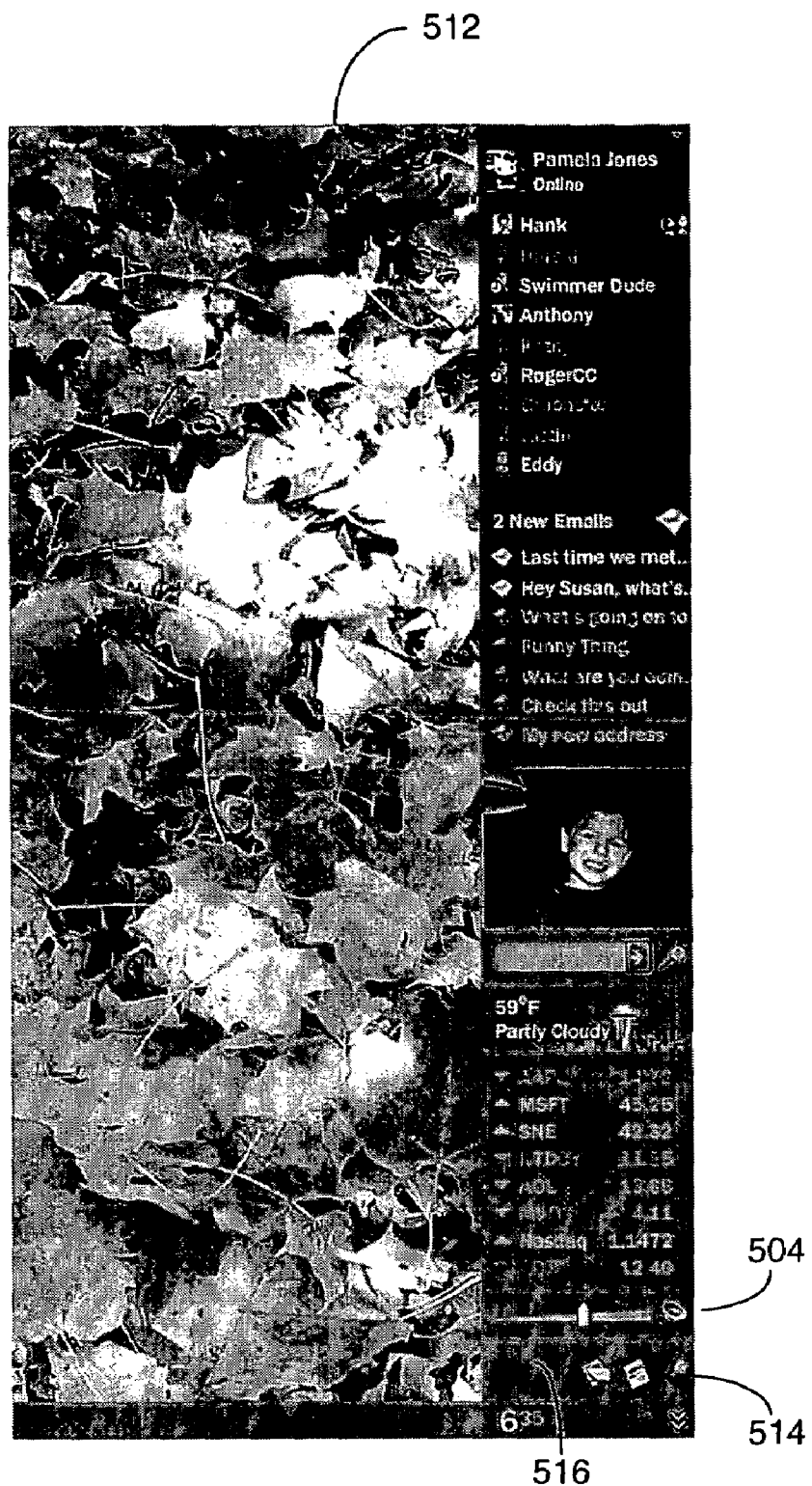
FIG. 5C illustrates the sidebar of FIG. 5B after the transient tile has been removed and placed in an overflow area.
Figure 6:
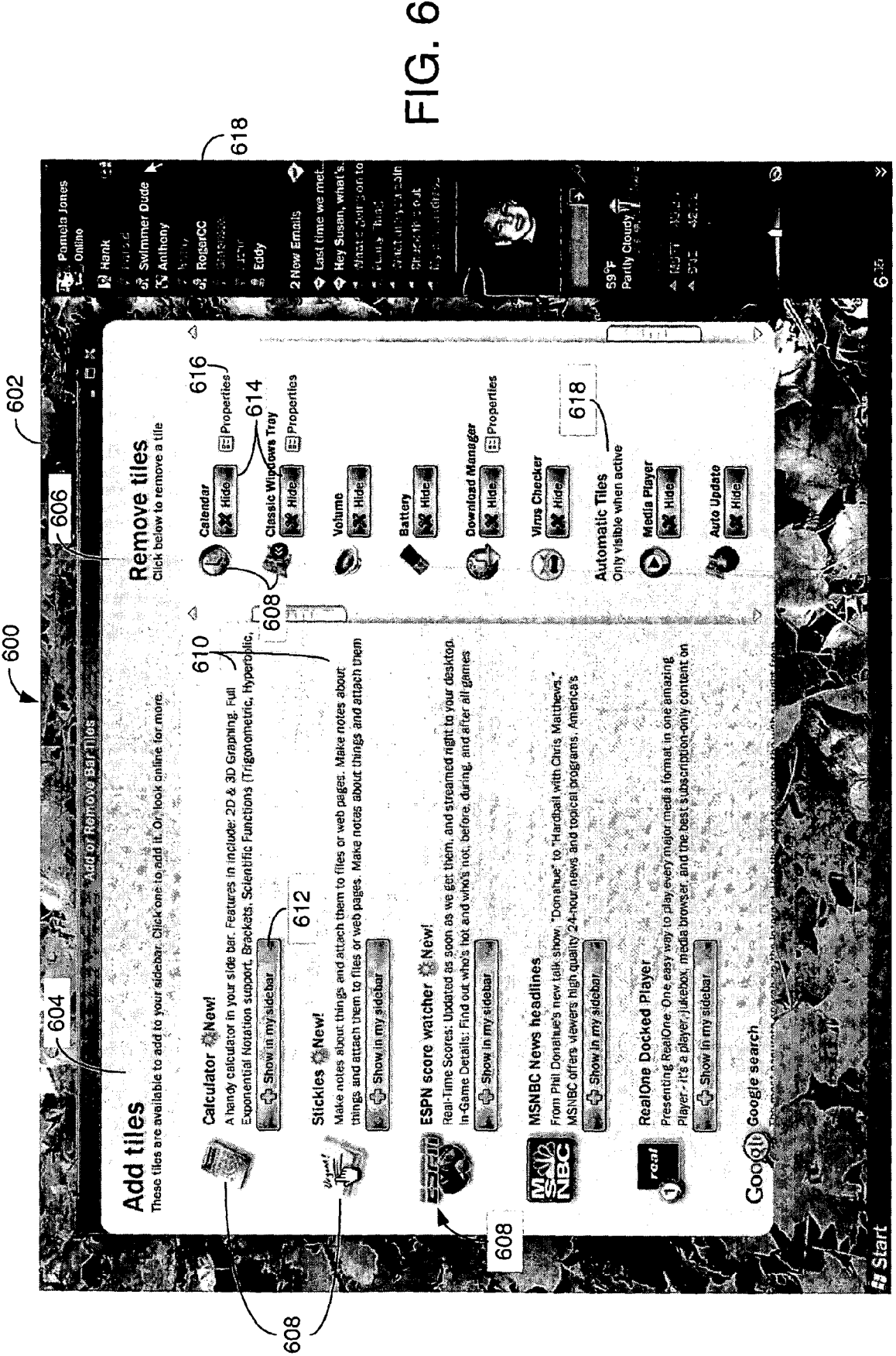
FIG. 6 illustrates an exemplary screen in accordance with an embodiment of the invention to facilitate a user's request to add or remove tiles from the sidebar.

A squished or compressed sidebar 510 is shown in display 507. The squished-sidebar 510 has all of its constituent tiles scaled down from their previous sizes in sidebar 502 of FIG. 5A. This squished preview state may only be maintained for a brief duration. The sidebar returns to its un-compressed state after the preview period and the transient tile is placed in the overflow area. This effect is shown in FIG. 5C, where transient progress bar tile 508 is removed from the sidebar 512, and a new icon 514 representative of the transient tile is placed in the overflow area 516.

The second mode of tile addition or removal operations includes user requested operations. User requested tile additions or removals may occur via a configuration interface, such as the one illustrated in display 600 of FIG. 6. By virtue of the operating environment or any previously installed application programs, a user may be presented with an options screen 602. In an embodiment of the present invention, option screen 602 includes an add tile column 604 and a remove tile column 606. Add tile column 604 provides the user with a tile image 608, a description 610 and a show button 612. After reviewing an associated description 610, a user may select the show button 612, to cause the associated tile to be placed within a sidebar. The process for placement of a tile within the sidebar is practically identical to that described earlier in reference to automatic tile addition. Compression of the sidebar and movement of tiles into the over flow area are practically identical. However, one exception does exist with regard to the behavior of a tile prior to the tile being bumped into the overflow area. When a manually added tile has caused a squishing of the sidebar to occur, tiles that are about to be bumped into the overflow area will flash. In other words, prior to the expansion of a previously compressed or squished sidebar and to the bumping of any tiles into the overflow area, the attention of the user may be drawn to the tiles that are about to be bumped.

Removal of an existing tile from the sidebar may be accompanied by user request via options screen 602. The remove tiles column 606 provides a user with a tile image 608, a properties icon 616 and a hide button 614. The remove tiles column 606 lists all existing and removable tiles that are within the sidebar. The remove tiles column 606 also indicates separately tiles that are of a transient nature. Transient tiles are designated under the automatic tiles heading 618. The properties icon 616, as the name suggests, enables the user to view information specific to the tile. The hide button 614 causes the removal of the associated tile from the sidebar or overflow area. In the case of a transient tile, the hide button 614 prevents the tile from showing up within the sidebar even when the transient tile is needed.

As mentioned earlier, tile addition may also occur by user designation from within an application program. For instance, an application can host a standard control that adds a tile to the sidebar. When such a tile is added to the sidebar, the tile may be placed at the top of the bar as opposed to the other situations, where the tile is placed at the bottom of the bar. In those instances where there is insufficient room in the sidebar, the sidebar is squished as in all other cases. Prior to expansion, the tiles at the bottom flash before getting bumped into the overflow.

Figure 9A:
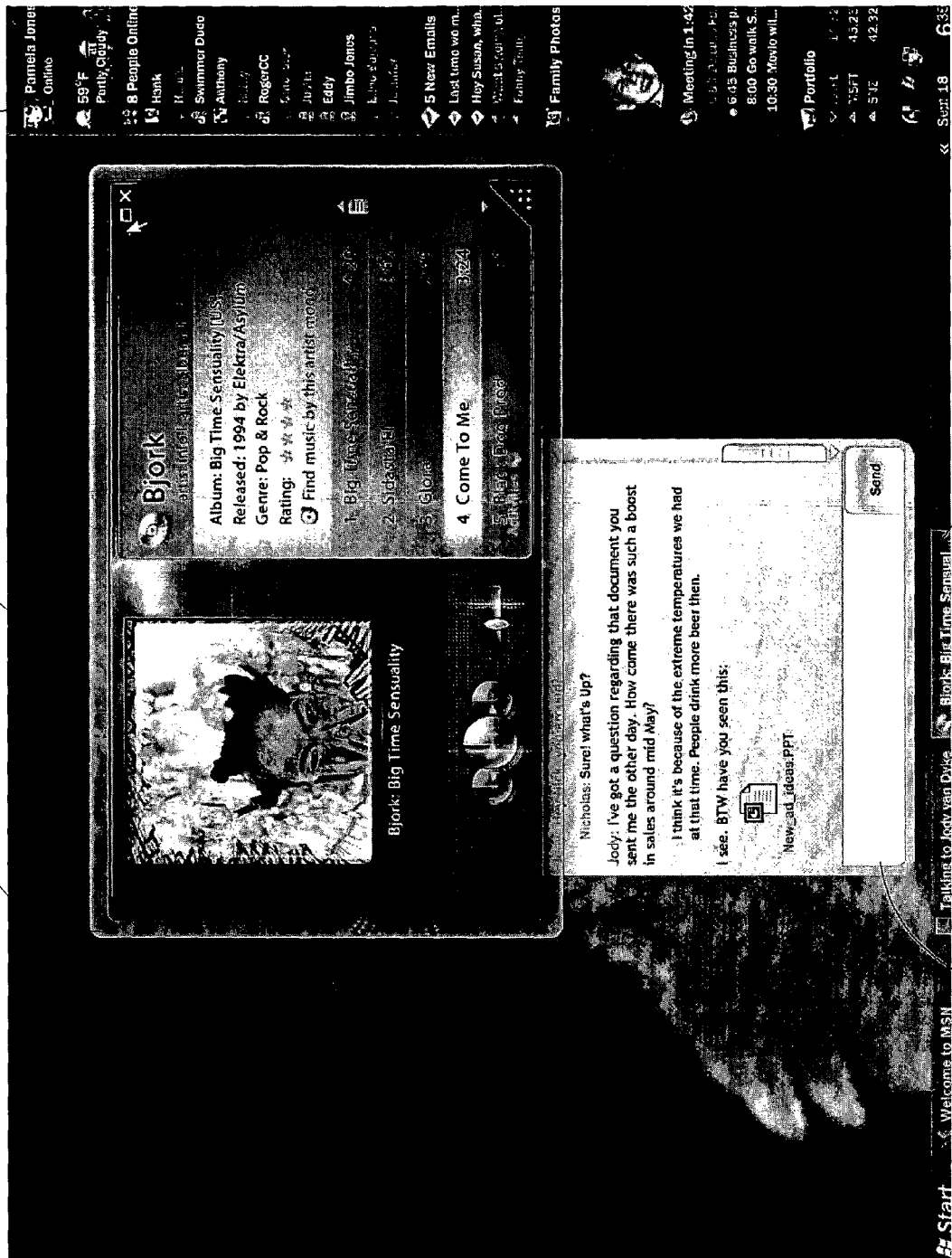
FIG. 9A is a screen shot showing an open application.
Figure 9B:
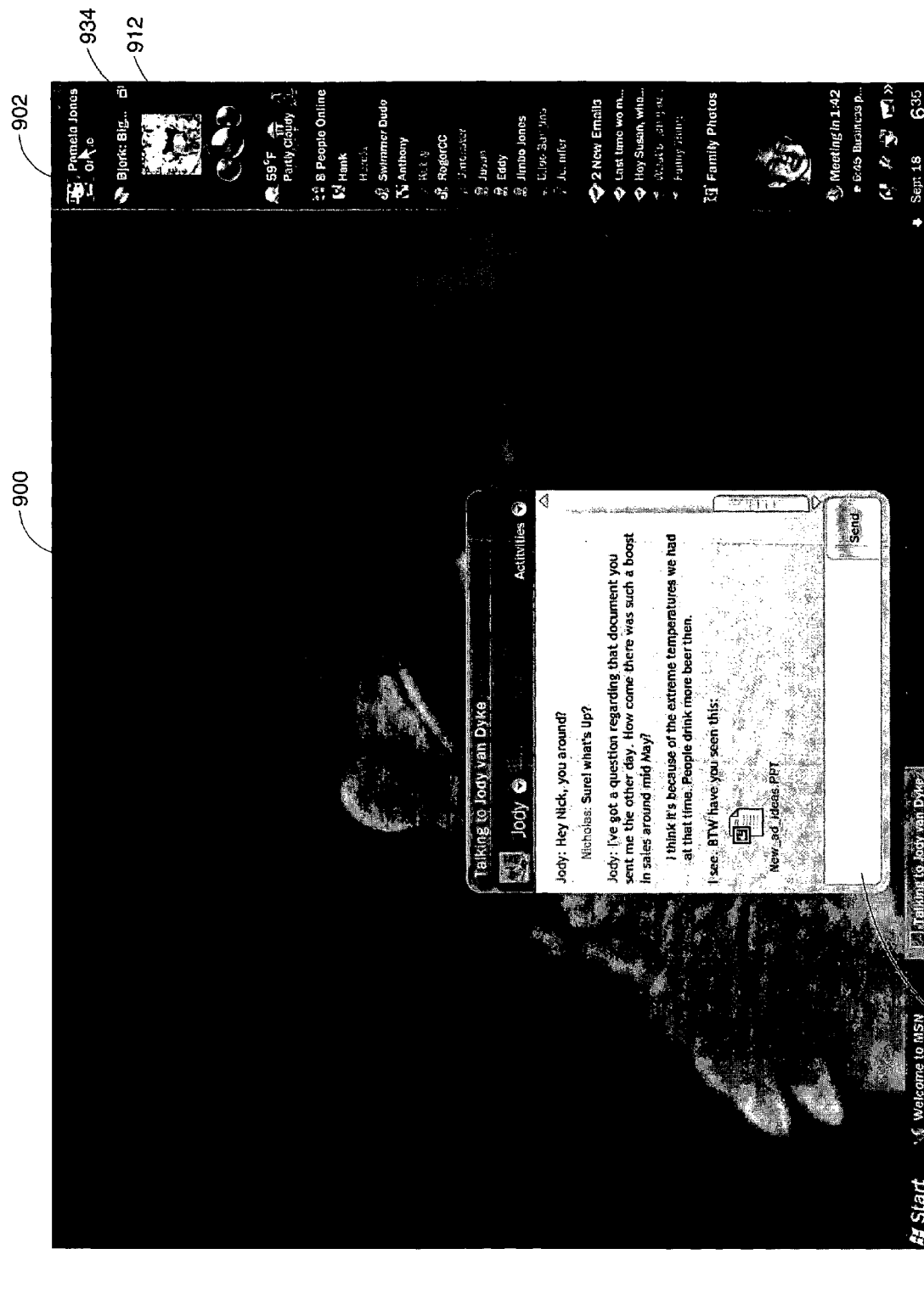
FIG. 9B is screen shot showing the application of FIG. 9A minimized in the sidebar.
Figure 9C:
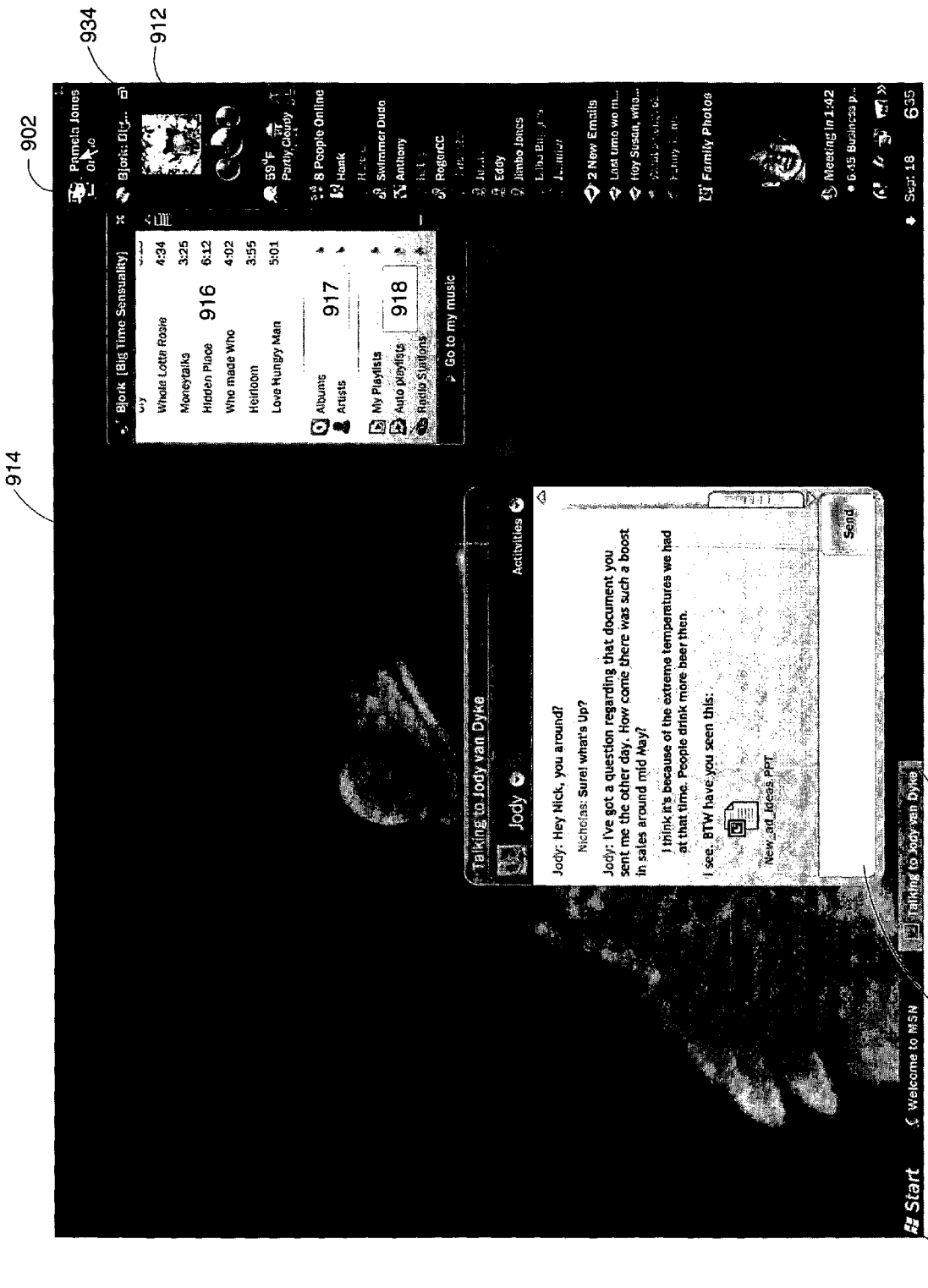
FIG. 9C is a screen shot showing important features available in the application minimized in the sidebar.

FIGS. 9A-9C are screen shots showing examples of the use of RMAs. FIG. 9A shows a display 900 having a taskbar 920 and a sidebar 902. The taskbar 920 includes icons 908 and 910 representing open applications 906 and 904 respectively. FIG. 9B illustrates the screen 900 upon minimization of the application 904 from FIG. 9A. Instead of the open application 904, FIG. 9B includes the minimized application 912 in the sidebar 902. The minimized application 912 may include a restore button 934 for restoring the application window and hiding the application tile. As shown in FIG. 9C, the application 912 is a rich minimized application. A fly-out window 914 provides song options 916, a directory for further albums and artists 917, and other play options 918. Despite the fact that the application is minimized, since the application is an RMA, it continues to provide functionality while it appears in the sidebar 902.

With rich minimized applications that live in the sidebar, a standard technique is provided for applications to provide access to controls and information even when the applications are minimized. The user has control over which applications are able to do this, and how much room the applications take up when they're minimized.

In a preferred embodiment of the present invention, sidebars as well as tiles are created by utilizing application program interface (API) routines provided by the vendor of the operating system or other third parties. In the described examples of the preferred embodiment, the operating system environment is Microsoft Windows. As would be understood by those skilled in the art, the system and method of the present invention could be implemented within other tools and other operating environments without departing from the scope contemplated herein. Examples of tools in which the present invention can be practiced include Direct X and Macromedia.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method in a computing system for providing a user interaction scheme comprising:
   defining a sidebar of a user interface;
   requesting an application appear in a sidebar when minimized, said application having a taskbar application button associated therewith; and
   minimizing the application upon receiving a minimize command to a rich minimized application (RMA), said minimizing including hiding the taskbar application button associated with the application, said RMA comprising a restore option allowing the user to restore the application, said minimizing comprising:
      revealing a tile in the sidebar to represent the RMA,
         wherein the sidebar configured to display a plurality of tiles corresponding to a plurality of RMAs,
         wherein revealing the tile includes displaying a sub-set of live-data provided by the application when not minimized to the RMA and a sub-set of interactive application features provided by the application when not minimized to the RMA in the tile,
         wherein the sub-set of interactive applications features do not include features related to sizing or re-sizing of the tile, and
         wherein the sub-set of interactive application features are selected by the application and the sub-set of interactive application features are determined to be useful by the application when minimized; and
      persisting the revealed tile in the sidebar when the user logs off the computing system wherein the revealed tile remains in the sidebar upon the next login of the user.

2. The method of claim 1, further comprising providing, in the tile, access to additional features not available in the application.

3. The method of claim 1, further comprising hiding an application window upon receiving the minimize command.

4. The method of claim 1, further comprising hiding an alt-tab entry associated with the application upon receiving the minimize command.

5. The method of claim 1, further comprising providing access to the sub-set of interactive application features through a fly-out menu accessible through the tile.

6. The method of claim 1, further comprising providing an available features selection module for allowing selection of the sub-set of interactive application features available through the tile.

7. The method of claim 1, further comprising allowing a user to determine a size of the tile.

8. A computer storage medium having computer executable instructions for performing the method of claim 1.

9. A method in a computing system for providing a user interaction scheme through the use of a sidebar, comprising:
   requesting an application appear in a sidebar when minimized; and
   moving an application to the sidebar upon receipt of a user command to minimize the application based on the request to a rich minimized application (RMA), said minimizing including hiding a taskbar application button associated with the application, said RMA comprising a restore option allowing the user to restore the application, said minimizing comprising:
      displaying at least a sub-set of interactive features belonging to the application when not minimized to the RMA, wherein the sub-set of interactive applications features do not include features related to sizing or re-sizing of the tile, wherein the sub-set of interactive application features are selected by the application and the sub-set of interactive application features are determined to be useful by the application when minimized to the RMA; and
      persisting the display of the at least a sub-set of the interactive features in the sidebar when the user logs off the computing system wherein the display of the at least a sub-set of the interactive features remains in the sidebar upon the next login of the user.

10. The method of claim 9, further comprising providing access to additional features not available in the application.

11. The method of claim 9, further comprising inserting a tile in the sidebar for providing access to the application.

12. The method of claim 9, further comprising hiding an application window upon receiving the minimize command.

13. The method of claim 9, further comprising hiding an alt-tab entry associated with the application upon receiving the minimize command.

14. The method of claim 11, further comprising providing access to the sub-set of interactive application features through a fly-out menu accessible through the tile.

15. The method of claim 11, further comprising providing the user with a restore button accessible through the tile to allow the user to maximize the application.

16. The method of claim 11, further comprising providing an available features selection module for allowing selection of the at least a sub-set of interactive features available through the tile.

17. The method of claim 11, further comprising allowing the user to determine a size of the tile.

18. A computer storage medium having computer executable instructions for performing the method of claim 7.

19. A system for providing user access to a variety of informational items, the system comprising:
   a processor associated with a computer for generating a sidebar of a user interface, said sidebar being configured for displaying a plurality of tiles, wherein each of the tiles represents a rich minimized application (RMA) and includes a sub-set of live-data provided by application and a sub-set of interactive application features provided by the application, said RMA further comprising a restore option;
   an insertion module for inserting at least one of the tiles into the sidebar wherein the sub-set of interactive features of the RMA represented by the inserted tile are displayed therein when the application is represented by the inserted tile in the sidebar, wherein the sub-set of interactive application features are selected by the application and the sub-set of interactive application features are determined to be useful by the application when included in the sidebar, and wherein the sub-set of interactive applications features do not include features related to sizing or re-sizing of the inserted tile, said inserting further comprising hiding a taskbar application button associated with the application; and
   an available features selection module for selecting the sub-set of interactive application features for display in and accessibility through the inserted tile; and
   user interface tools for allowing a user to command placement of a selected application into the sidebar, wherein the tile corresponding to the selected application persists in the sidebar when the user logs off the computer and wherein tile corresponding to the selected application remains in the sidebar upon the next user login to the computer.

20. The system of claim 19, further comprising special controls for allowing removal of the application from the sidebar.

21. The system of claim 19, further comprising sidebar controls for hiding an alt-tab entry associated with the application, and an application window associated with the application upon receiving the minimize command.

22. The system of claim 19, further comprising a fly-out menu for providing access to the selected sub-set of interactive application features displayed in the tile.

23. A system for providing access to a minimized email application through a user interface, the system comprising:
 a processor associated with a computer;
 an available feature selection module for allowing an email application to provide one or more selected interactive features of the email application including at least a sub-set of a full feature set upon minimization of the email application to a rich minimized application (RMA) wherein the selected interactive application features include access to new and unread email messages received by the email application while minimized; and
 a tile insertion module for revealing a tile corresponding to the RMA, said RMA comprising a restore option, and for displaying the selected interactive features in the tile in response to minimization of the email application, said displaying including hiding a taskbar application button associated with the application, wherein the selected interactive applications features do not include features related to sizing or re-sizing of the tile, wherein the tile insertion module reveals the tile in a sidebar configured to host the tile within the user interface, wherein the sidebar includes a plurality of tiles corresponding to a plurality of applications, wherein the tile corresponding to the minimized application persists in the sidebar when the user logs off the computer and wherein tile corresponding to the application remains in the sidebar upon the next user login to the computer.

24. The system of claim 23, further comprising a restoration module for restoring the email application through the use of the tile.

25. The system of claim 23, further comprising special controls for allowing removal of the email application from the sidebar.

26. The system of claim 23, further comprising sidebar controls for hiding an alt-tab entry and an application window upon receiving the minimize command.

27. The system of claim 23, further comprising a fly-out menu for providing access to the one or more selected interactive features displayed in the tile.

* * * * *

UNITED STATES PATENT AND TRADEMARK OFFICE
CERTIFICATE OF CORRECTION

| | | |
|---|---|---|
| PATENT NO. | : 7,669,140 B2 | Page 1 of 1 |
| APPLICATION NO. | : 10/644967 | |
| DATED | : February 23, 2010 | |
| INVENTOR(S) | : Matthews et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,669,140 B2 | Page 1 of 1 |
| APPLICATION NO. | : 10/644967 | |
| DATED | : February 23, 2010 | |
| INVENTOR(S) | : David A. Matthews et al. | |

It is certified that error appears in the above-identified patent and that said Letters Patent is hereby corrected as shown below:

In column 16, line 44, in Claim 19, after "by" insert -- an --.

Signed and Sealed this
Fifteenth Day of February, 2011

David J. Kappos
*Director of the United States Patent and Trademark Office*